United States Patent
Tsukamoto

(10) Patent No.: US 9,616,927 B2
(45) Date of Patent: Apr. 11, 2017

(54) PARKING ASSISTANCE SYSTEM

(71) Applicant: Nissan Motor Co., Ltd., Yokohama-Shi, Kanagawa (JP)

(72) Inventor: Yukinori Tsukamoto, Kanagawa (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/114,338

(22) PCT Filed: Jan. 30, 2014

(86) PCT No.: PCT/JP2014/052108
§ 371 (c)(1),
(2) Date: Jul. 26, 2016

(87) PCT Pub. No.: WO2015/114776
PCT Pub. Date: Aug. 6, 2015

(65) Prior Publication Data
US 2017/0001665 A1 Jan. 5, 2017

(51) Int. Cl.
*G08G 1/14* (2006.01)
*B62D 15/02* (2006.01)
*G08G 1/16* (2006.01)

(52) U.S. Cl.
CPC ........... *B62D 15/028* (2013.01); *G08G 1/168* (2013.01)

(58) Field of Classification Search
None
See application file for complete search history.

(56) References Cited

U.S. PATENT DOCUMENTS

| | | | |
|---|---|---|---|
| 2010/0309024 A1* | 12/2010 | Mimeault | G08G 1/04 340/932.2 |
| 2012/0062396 A1 | 3/2012 | Inoue et al. | |
| 2012/0323423 A1 | 12/2012 | Nakamura et al. | |
| 2016/0039293 A1* | 2/2016 | Niizuma | B60L 11/1803 307/9.1 |

FOREIGN PATENT DOCUMENTS

| | | |
|---|---|---|
| CN | 102483457 A | 5/2012 |
| JP | 2234012 A | 9/1990 |
| JP | H07190717 A | 7/1995 |
| JP | 11118420 A | 4/1999 |

(Continued)

*Primary Examiner* — Brent Swarthout
(74) *Attorney, Agent, or Firm* — Young Basile Hanlon & MacFarlane, P.C.

(57) ABSTRACT

A parking assistance system includes: a light source provided at a parking position at which a power transmission coil is provided, and configured to emit light; at least two light reception units mounted away from each other on a vehicle including a power reception coil, and each configured to receive the light emitted from the light source by using a position sensitive detector; an incident-angle calculation unit configured to calculate the incident angle of the light on each of the light reception units; a distance calculation unit configured to calculate the distance between the parking position and the vehicle from the incident angles of the light on the light reception units; and a detection unit configured to detect that the vehicle has approached the parking position. The light volume of the light source is reduced when the vehicle has approached the parking position.

3 Claims, 11 Drawing Sheets

(56) References Cited

FOREIGN PATENT DOCUMENTS

| JP | 2011015549 A | 1/2011 |
|----|--------------|--------|
| JP | 2011182608 A | 9/2011 |
| JP | 2011188679 A | 9/2011 |
| JP | 2012093195 A | 5/2012 |
| JP | 5137139 B2   | 2/2013 |

* cited by examiner

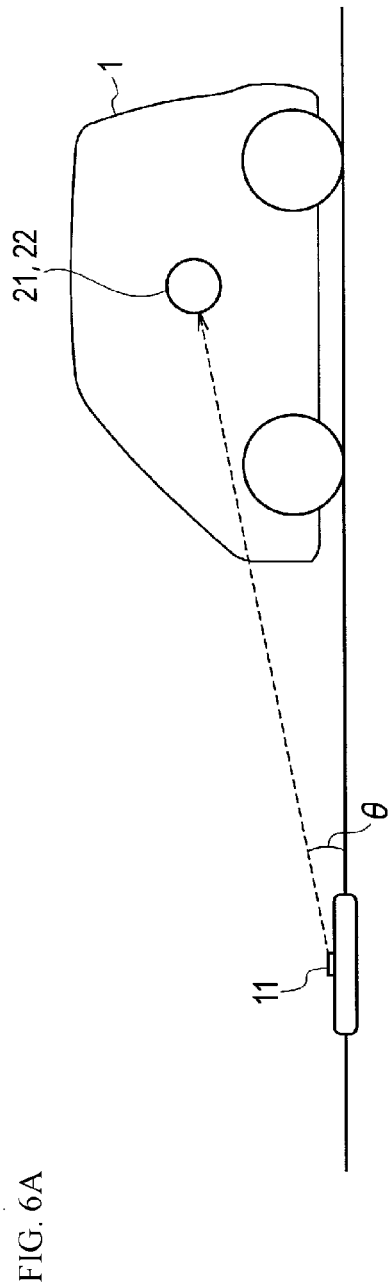
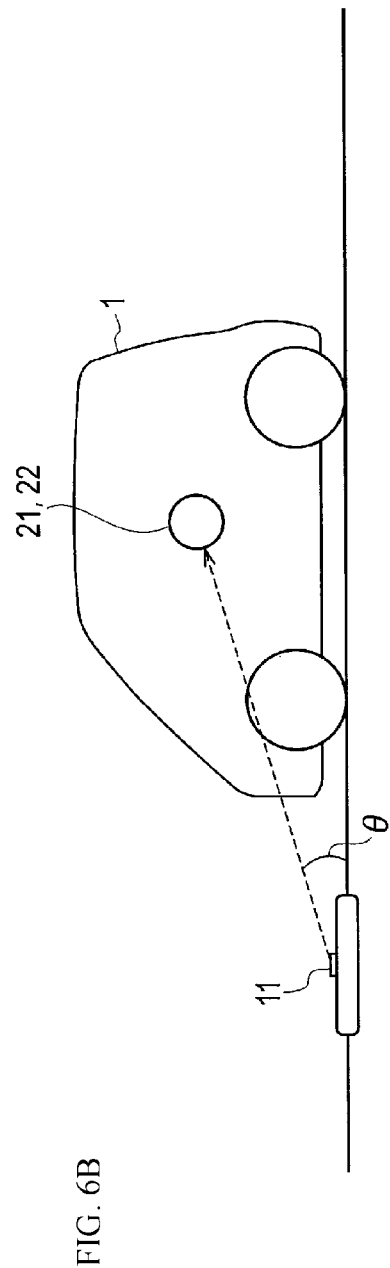

PARKING ASSISTANCE SYSTEM

TECHNICAL FIELD

The present application relates to a parking assistance system for assisting parking of a vehicle.

BACKGROUND

Conventional parking assistance systems have been known which measure the distance between a target parking position and a vehicle to detect the position of the vehicle relative to the parking position. Such systems are usually ones that utilize reflection of transmitted waves like a sonar and the like (see Japanese Patent No. 5137139, for example).

However, in the case of those systems that utilize reflection of transmitted waves, the area capable of receiving the reflected waves changes depending on the shape and orientation of the target object that reflects the transmitted waves. In addition, the transmitted waves might be reflected on an object other than the target object and cause false detection.

SUMMARY

In view of the above-mentioned problems, an object of the present invention is to provide a parking assistance system capable of accurately detecting the position of a vehicle relative to a parking position in the parking of the vehicle at the parking position.

A parking assistance system according to an aspect of the present invention is configured to: receive light emitted from a light source provided at a parking position by using a plurality of position sensitive detectors; calculate the incident angle of the light on each of the plurality of position sensitive detectors; calculate the distance between the parking position and the vehicle based on the incident angles of the light; and reduce the light volume of the light source upon detection that the vehicle has approached the parking position.

According to the present invention, it is possible to provide a parking assistance system capable of accurately detecting the position of a vehicle relative to a parking position in the parking of the vehicle at the parking position.

BRIEF DESCRIPTION OF DRAWINGS

FIG. 6(a) is a schematic diagram showing a state where the vehicle is distant from a light source, and FIG. 6(b) is a schematic diagram showing a state where the vehicle has approached the light source;

DETAILED DESCRIPTION OF THE EMBODIMENTS

[First Embodiment]

Figure 1:
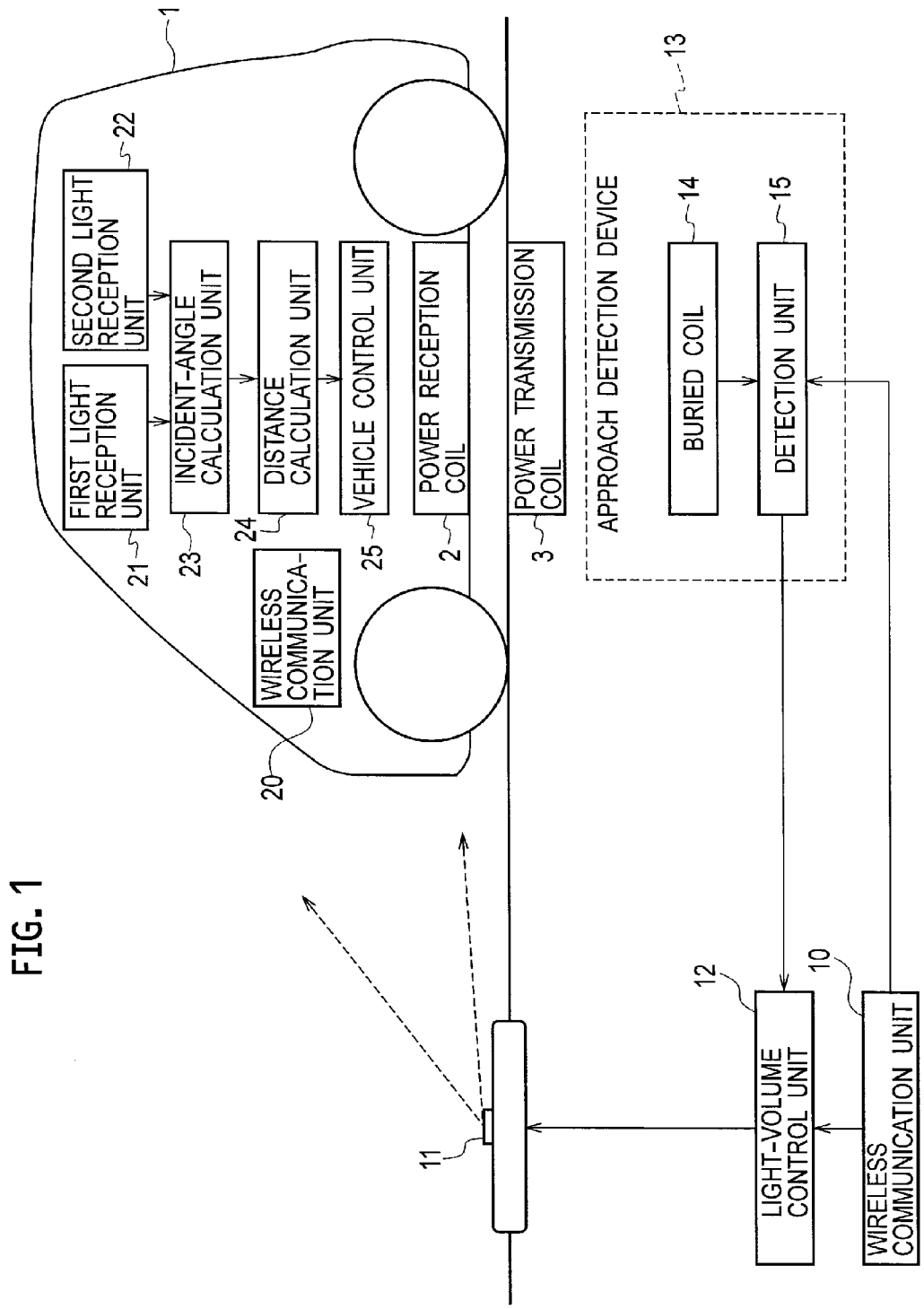
FIG. 1 is a schematic diagram showing one example of a parking assistance system according to a first embodiment of the present invention.

A parking assistance system according to a first embodiment of the present invention is designed to be utilized in the parking of a vehicle 1 including a power reception coil 2 at a parking position where a power transmission coil 3 is provided, as shown in FIG. 1. When the vehicle 1 is parked at the parking position, the power transmission coil 3 and the power reception coil 2 face each other as shown in FIG. 1, thus allowing wireless power supply in which power is wirelessly transmitted and received between the power transmission coil 3 and the power reception coil 2.

The parking assistance system according to the first embodiment of the present invention includes a light source 11, a light-volume control unit 12, and an approach detection device 13 that are provided on the ground side, and two (first and second) light reception units 21, 22, an incident-angle calculation unit 23, a distance calculation unit 24, and a vehicle control unit 25 that are provided on the vehicle 1 side. Also, wireless communication units 10, 20 configured to perform bidirectional communication are provided on the ground side and the vehicle 1 side, respectively.

The light source 11 is provided at the parking position where the power transmission coil 3 is provided. As the light source 11, an infrared light emitting diode (LED) can be used, for example, and one that is capable of switching its light volume between a large volume and a small volume is used. Here, "light volume" represents integration of the luminous flux with respect to time, and the lumen second [lm·s] is used as its unit. The light volume of the light source 11 can be optionally set in accordance with the range of detection of the position of the vehicle 1, the performance of the first and second light reception units 21, 22, and the like.

Figure 2:
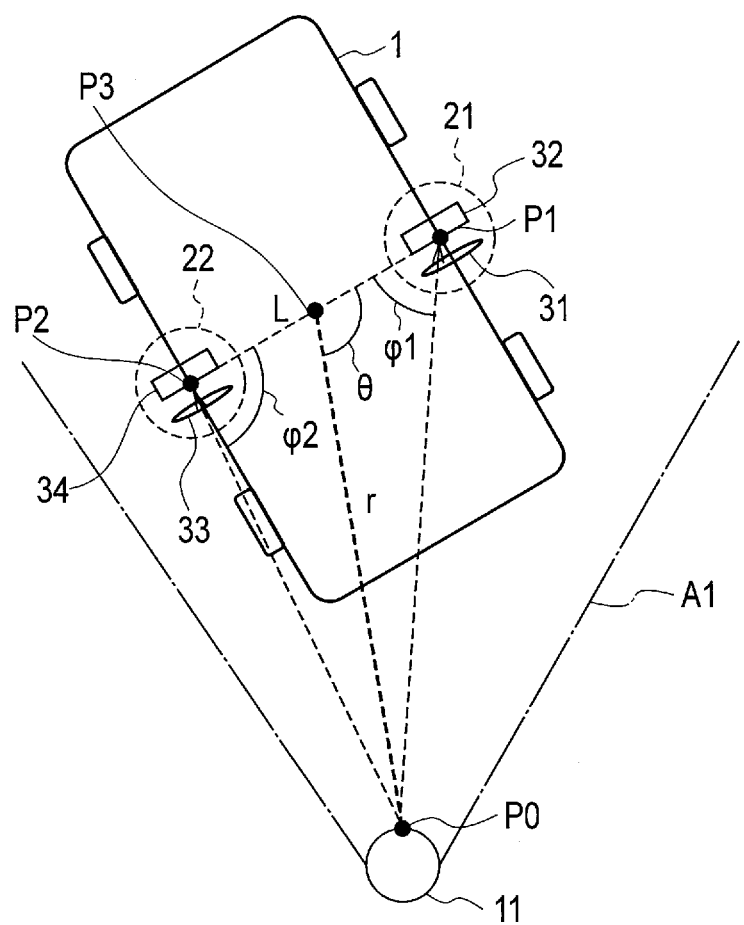
FIG. 2 is a schematic diagram for explaining a distance calculation method according to the first embodiment of the present invention.

The light source 11 may include two types of LEDs differing in light volume, for example, and may be used by switching between these LEDs to switch the light volume between the large volume and the small volume. Alternatively, the light source 11 may switch the light volume between the large volume and the small volume by changing the value of current caused to flow through or voltage applied to a single LED, by switching a single LED between a lighting state and a flashing state, or by changing the intervals of flashing of a single LED. As shown in FIG. 2, the light source 11 emits light within a predetermined range A1 in the direction from which the vehicle 1 approaches.

As shown in FIG. 2, the first and second light reception units 21, 22 are attached away from each other to the opposite side surfaces of the vehicle 1. The positions of the first and second light reception units 21, 22 on the vehicle 1 and the distance between the first and second light reception units 21, 22 are fixed and already known.

Note that the positions where the first and second light reception units 21, 22 are attached are not particularly limited as long as the first and second light reception units 21, 22 can both receive light from the light source 11 at the same time in the parking of the vehicle 1 at the parking position. For example, the first and second light reception units 21, 22 may be attached away from each other in the vehicle width direction to a front end portion or rear end portion of the vehicle 1. Note that in the embodiments of the present invention, at least two light reception units may only be attached to the vehicle 1, and the number of light reception units attached to the vehicle 1 is not particularly limited. Three or four or more light reception units may be disposed at positions from which light from the light source 11 can be easily received, and at least two of these light reception units may be used to calculate the position of the vehicle 1 in a manner to be described later.

The first light reception unit 21 includes a lens 31 and a position sensitive detector (PSD) 32 disposed away from the lens 31, while the second light reception unit 22 includes a lens 33 and a PSD 34 disposed away from the lens 33. The light receiving surfaces of the PSDs 32, 34 of the first and second light reception units 21, 22 are disposed on the same plane in parallel with each other in the vehicle width direction.

Figure 3:
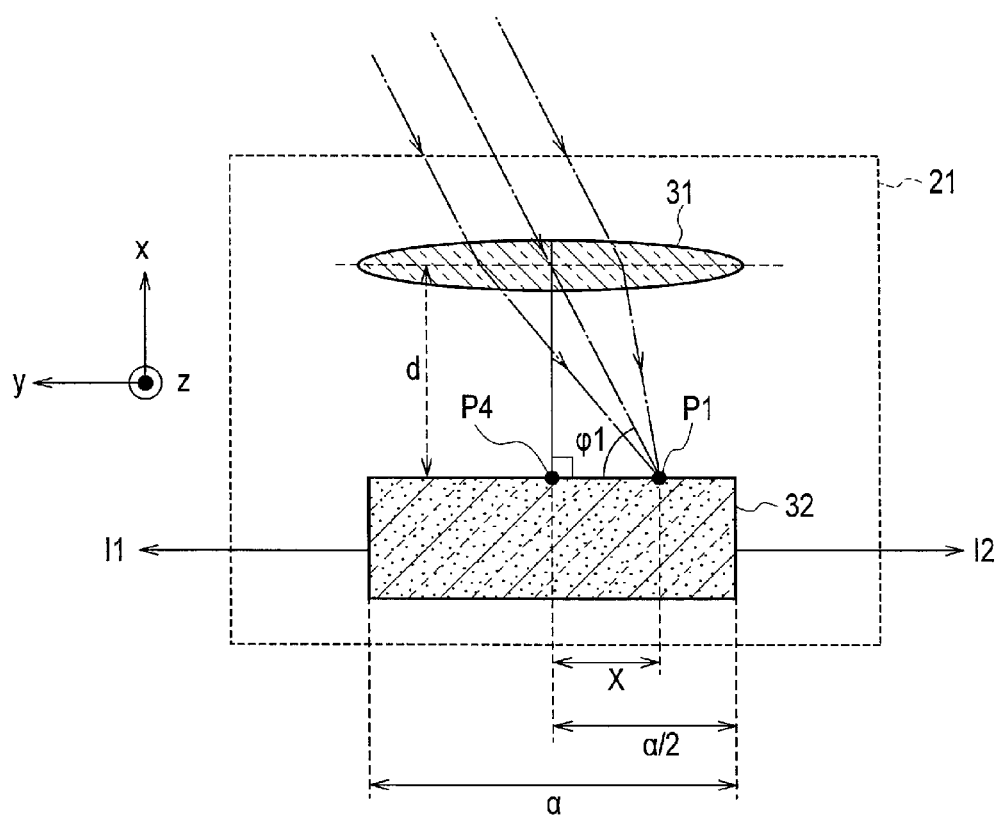
FIG. 3 is a schematic diagram showing one example of a light reception unit according to the first embodiment of the present invention.

Next, a specific configuration of the first light reception unit 21 will be described using FIG. 3. Note that a specific configuration of the second light reception unit 22 is similar to that of the first light reception unit 21. In FIG. 3, the x-axis direction represents the vehicle front-rear direction, the y-axis direction represents the vehicle width direction, and the z-axis direction represents the vertical direction.

The lens 31 of the first light reception unit 21 is configured to concentrate light emitted from the light source 11 on the PSD 32. For the lens 31, a resin that blocks visible light can be used, for example. Note that pinholes may be used instead of the lens 31.

The light receiving surface of the PSD 32 is disposed at a position at a focal length d of the lens 31 in the vehicle front-rear direction (x-axis direction). Also, the center of a width a of the PSD 32 and the center of the lens 31 are disposed to coincide with each other in the vehicle width direction (y-axis direction). The focal length d of the lens 31 and a center position P4 on the light receiving surface of the PSD 32 are fixed and already known. Note that this center position P4 on the PSD 32, for example, can be set as the position of the first light reception unit 21 on the vehicle 1.

The PSD 32 is formed of a resistor and a photodiode, and carriers are generated at a position on which light is incident, and a current flows. The PSD 32 includes two output terminals in the vehicle width direction (y-axis direction). Thus, an incident position (the position of the center of gravity) P1 of light on the PSD 32 can be calculated from a ratio I1/I2 of output currents I1, I2 at those output terminals. Note that the embodiments of the present invention will be described using a one-dimensional PSD 32 including two output terminals at the both ends in the vehicle width direction (y-axis direction); however, it is also possible to use a two-dimensional PSD including four output terminals at the both ends in the vehicle width direction (y-axis direction) and the vertical direction (z-axis direction).

The incident-angle calculation unit 23, the distance calculation unit 24, and the vehicle control unit 25, which are shown in FIG. 1, can be constructed of a computer including a central processing unit (CPU) and storage means such as an RAM, an ROM, and a hard disk drive. The incident-angle calculation unit 23 is configured to calculate the incident position P1 of light on the PSD 32 from the ratio I1/I2 of the output currents I1, I2 from the first light reception unit 21, which is shown in FIG. 3. The incident-angle calculation unit 23 is further configured to read the center position P4 of the lens 31 and the focal length d of the lens 31 out of the storage means and calculate an incident angle φ1 of the light on the PSD 32 from a distance x between the incident position P1 of the light on the PSD 32 and the center position P4 and the focal length d of the lens 31.

For the second light reception unit 22, which is shown in FIG. 2, too, the incident-angle calculation unit 23 calculates an incident position P2 of the light on the PSD 34 and further calculates an incident angle φ2 of the light on the PSD 34 in a manner similar to that for the first light reception unit 21.

The distance calculation unit 24 is configured to read the positions of the first and second light reception units 21, 22 out of the storage means and calculate a distance L between the incident positions P1, P2 of the light, which is shown in FIG. 2, from the positions of the first and second light reception units 21, 22 and the incident positions P1, P2 of the light, which are calculated by the incident-angle calculation unit 23. The distance calculation unit 24 is further configured to calculate a position P0 of the light source 11 relative to the incident positions P1, P2 of the light from the incident angles φ1, φ2 of the light, which are calculated by the incident-angle calculation unit 23, and the distance L between the incident positions P1, P2 of the light by using the principle of triangulation.

The distance calculation unit 24 is further configured to read a position P3 of the vehicle 1 out of the storage means and calculates a distance r between the position P3 of the vehicle 1 and the position P0 of the light source 11 and an orientation θ of the vehicle 1. Here, the position P3 of the vehicle 1 is a position at an equal distance from the positions of the first and second light reception units 21, 22, for example, and is set in advance. Alternatively, the position of either one of the first and second light reception units 21, 22 may be set as the position of the vehicle 1.

The orientation θ of the vehicle 1 is the angle formed between the vehicle width direction and a line segment connecting the position P0 of the light source 11 and the position P3 of the vehicle 1. Alternatively, the orientation of the vehicle 1 may be the angle formed between the vehicle front-rear direction and the line segment connecting the position P0 of the light source 11 and the position P3 of the vehicle 1.

The vehicle control unit 25 is capable of notifying the driver of the position of the vehicle 1 relative to the parking position by displaying on a display unit the distance r between the vehicle 1 and the parking position and the orientation θ of the vehicle 1, which are calculated by the distance calculation unit 24, for example. Alternatively, the vehicle control unit 25 may control the vehicle 1 and perform automatic driving based on the distance r between the vehicle 1 and the parking position and the orientation θ of the vehicle 1, which are calculated by the distance calculation unit 24.

Next, the method of controlling the light volume of the light source 11 according to the first embodiment of the present invention will be described. Assume that the distance r between the vehicle 1 and the parking position is to be detected in a predetermined range with the position P0 of the light source 11 set as an origin. In this case, if the light source 11 emits such a volume of light that the light can be detected from a distant position in the predetermined range, the light might be saturated and fail to be detected at the first and second light reception units 21, 22 when the vehicle 1 approaches the light source 11. To solve this problem, the light volume of the light source 11 is controlled as follows in the first embodiment of the present invention.

The approach detection device 13, shown in FIG. 1, is configured to detect that the vehicle 1 has approached the parking position. The approach detection device 13 includes a buried coil (loop coil) 14 buried in the ground at the parking position and a detection unit 15 connected to the buried coil 14. The buried coil 14 is configured to change in inductance as the vehicle 1 approaches. The detection unit 15 is configured to measure the inductance of the buried coil 14 and detect that the vehicle 1 has approached the parking position from change in the inductance.

The light-volume control unit 12 can be constructed of a computer including a central processing unit (CPU) and storage means such as an RAM, an ROM, and a hard disk drive. The light-volume control unit 12 is configured to control the light volume of the light source 11 in accordance with the result of the detection by the approach detection device 13.

Figure 4A:
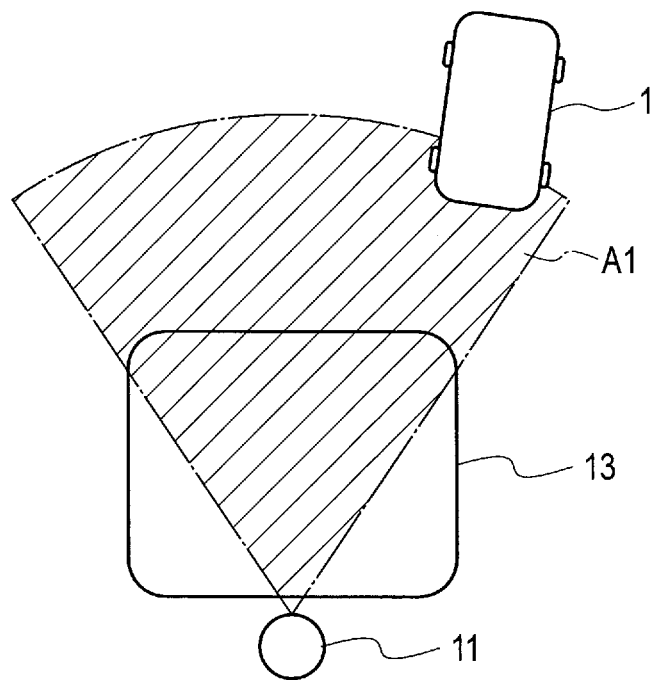
FIG. 4((a) is a schematic diagram showing a state where a vehicle is distant from a parking position, and FIG. 4(b) is a schematic diagram showing a state where the vehicle has approached the parking position.
Figure 4B:
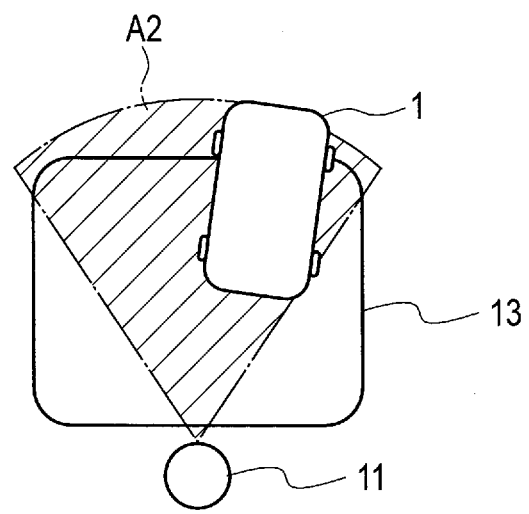

As shown in Part (a) of FIG. 4, when the vehicle 1 is distant from the parking position and the approach detection device 13 does not detect that the vehicle 1 has approached, the light-volume control unit 12 causes the light source 11 to emit a relatively large volume of light. On the other hand, as shown in Part (b) of FIG. 4, when the vehicle 1 approaches the parking position and the approach detection device 13 detects that the vehicle 1 has approached, the light-volume control unit 12 reduces the light volume of the light source 11 and causes the light source 11 to emit a relatively small volume of light. In Parts (a) and (b) of FIG. 4, the shaded regions indicate light emission ranges A1, A2 from the light source 11, respectively.

In one example, the light source 11 may include two types of LEDs differing in light volume, and cause the LED with the larger light volume to light up before the approach of the vehicle 1 is detected and switch to cause the LED with the smaller light volume to light up after the approach of the vehicle 1 is detected. Alternatively, the light volume of the light source 11 may be reduced by switching a single LED from a lighting state to a flashing state or by changing the intervals of flashing of a single LED. Still alternatively, the light source 11 may be dimmed by reducing the value of the current through or the voltage across an LED.

Figure 5:
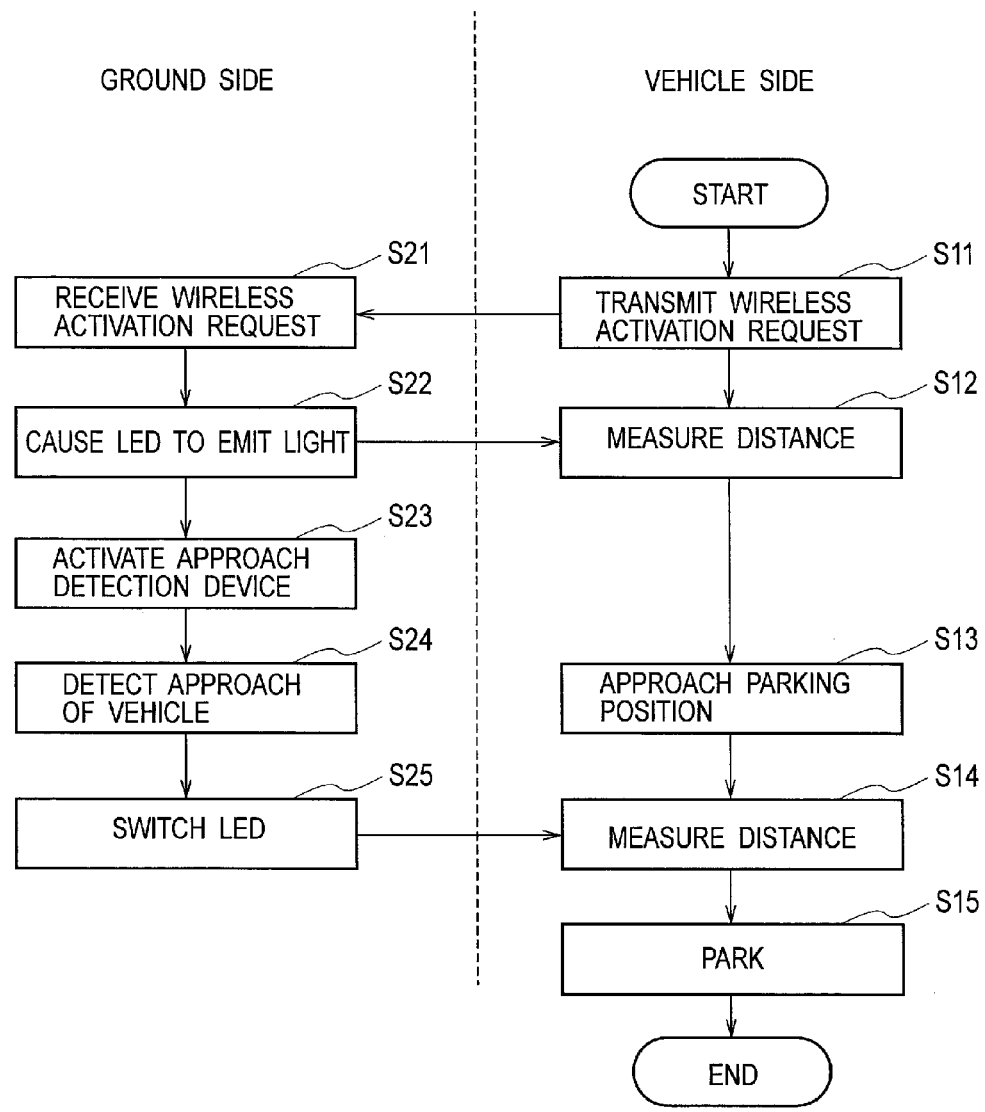
FIG. 5 is a flowchart showing one example of a parking assistance method according to the first embodiment of the present invention.

Next, one example of a parking assistance method according to the first embodiment of the present invention will be described with reference to a flowchart in FIG. 5.

First in Step S11, when the vehicle 1 starts being parked, the wireless communication unit 20, mounted on the vehicle 1, transmits a wireless activation request to the wireless communication unit 10 on the ground side. When the wireless communication unit 10 on the ground side receives the wireless activation request in Step S21, the light source 11 starts emitting light in Step S22 and maintains the light emitting state. The light volume of the light source 11 in this step is controlled to be the relatively large volume by the light-volume control unit 12. Meanwhile, when the wireless communication unit 10 on the ground side receives the wireless activation request in Step S21, the approach detection device 13 is activated in Step S23 as well.

On the other hand, on the vehicle 1 side, in Step S12, the first and second light reception units 21, 22 receive the light emitted by the light source 11. The incident-angle calculation unit 23 calculates the incident angles $\phi 1$, $\phi 2$ of the light based on the incident positions P1, P2 of the light on the PSDs 32, 34 of the first and second light reception units 21, 22, respectively. The distance calculation unit 24 calculates the distance r between the vehicle 1 and the parking position and the orientation $\theta$ of the vehicle 1 based on the incident positions P1, P2 of the light on the PSDs 32, 34 and the incident angles $\phi 1$, $\phi 2$ of the light. This process in Step S12 can be continuously repeated at a predetermined interval.

In Step S13, the vehicle 1 gradually approaches the parking position. When the vehicle 1 reaches a predetermined position, the approach detection device 13 on the ground side detects in Step S24 that the vehicle 1 has approached the parking position.

After the approach detection device 13 detects that the vehicle 1 has approached the parking position, the light-volume control unit 12 reduces the light volume of the light source 11 in Step S25.

As in Step S12, in Step S14 on the vehicle 1 side, the first and second light reception units 21, 22 receive the light emitted from the light source 11. The incident-angle calculation unit 23 calculates the incident angles $\phi 1$, $\phi 2$ of the light based on the incident positions P1, P2 of the light, respectively. The distance calculation unit 24 calculates the distance r between the vehicle 1 and the parking position and the orientation $\theta$ of the vehicle 1 based on the incident angles $\phi 1$, $\phi 2$ of the light. This process in Step S14 can be continuously repeated at a predetermined interval.

The parking is completed in Step S15 when the distance r and the orientation $\theta$ calculated by the distance calculation unit 24 in Step S14 reach predetermined conditions.

As described above, the parking assistance system according to the first embodiment of the present invention calculates the incident angles $\phi 1$, $\phi 2$ of light on the two PSDs 32, 34, respectively, and calculates the distance r between the vehicle 1 and the parking position and the orientation $\theta$ of the vehicle 1 based on these incident angles $\phi 1$, $\phi 2$ of the light. In this way, the position of the vehicle 1 can be accurately detected. Consequently, the vehicle 1 can be accurately parked at the target parking position, and power can be wirelessly supplied between the power transmission coil 3 of the vehicle 1 during parking and the power transmission coil 3, which is provided at the parking position.

Further, unlike conventional systems utilizing reflection of transmitted waves, the parking assistance system according to the first embodiment of the present invention is free from situations where the area capable of receiving the reflected waves might change depending on the shape and orientation of the target object, and the transmitted waves might be reflected on an object other than the target object and cause false detection. Hence, the position of the vehicle 1 relative to the parking position can be stably detected.

Further, the light volume of the light source 11 is reduced as the vehicle 1 approaches the parking position. This can prevent saturation of light at the first and second light reception units 21, 22 when the vehicle 1 approaches the parking position. Hence, the position of the vehicle 1 relative to the parking position can be stably detected.

In the first embodiment of the present invention, the instance has been described in which the first and second light reception units 21, 22 are included. Note, however, that the three or more light reception units may be included. In that case, any two of the three or more light reception units can be used to detect the position of the vehicle 1. Also, a plurality of sets of first and second light reception units 21, 22 may be included. For example, one set of first and second light reception units 21, 22 may be attached to a front end portion of the vehicle 1 and another set to a rear end portion thereof.

Also, in the first embodiment of the present invention, the instance has been described in which the approach detection device 13 detects whether or not the vehicle 1 has approached, and the light volume of the light source 11 is switched between a large volume and a small volume based on the result of the detection. However, the present invention is not limited to this instance. For example, the approach detection device 13 may detect approach of the vehicle 1 in two or more steps, and the light volume of the light source 11 may be stepwise reduced in two or more steps as the vehicle 1 approaches.

[Second Embodiment]

A parking assistance system according to a second embodiment of the present invention differs from the parking assistance system according to the first embodiment of the present invention in the configuration of the first and second light reception units 21, 22.

FIG. 6(a) shows a state where the vehicle 1 is distant from the parking position whereas FIG. 6(b) shows a state where the vehicle 1 is near the parking position. As shown in FIGS. 6(a) and 6(b), the angle (angle of depression) θ of light from the light source 11 with respect to the horizontal direction changes in accordance with the distance between the vehicle 1 and the parking position.

Figure 7A:
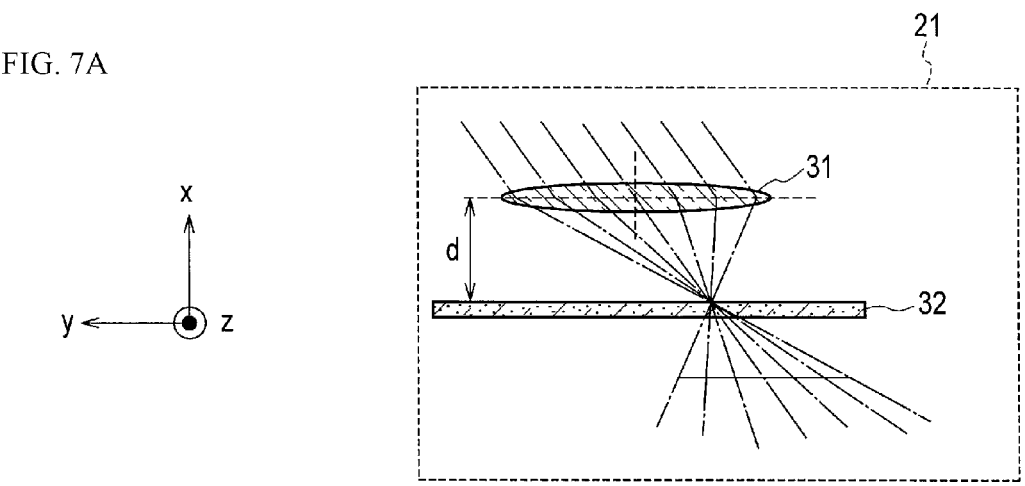
FIGS. 7(a) and 7(b) are schematic diagrams in an instance where a PSD of a light reception unit according to a second embodiment of the present invention is present at the focal length of a lens.
Figure 7B:
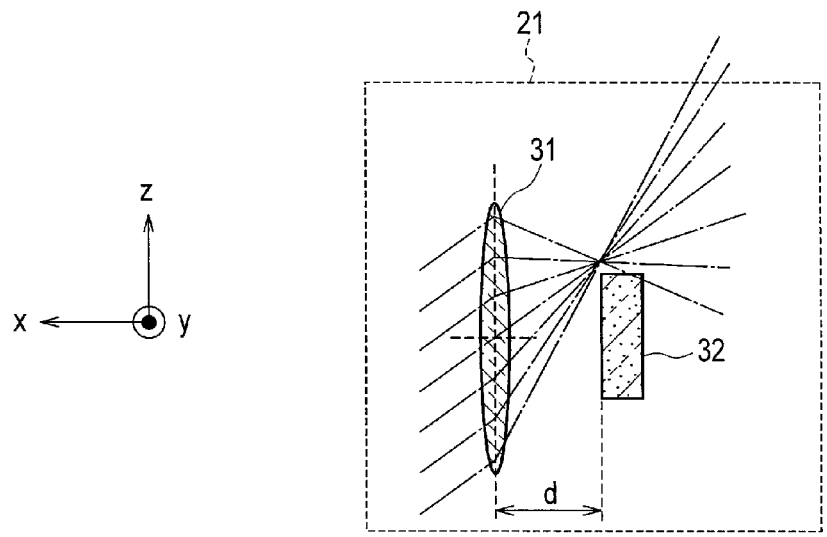

In the following, of the first and second light reception units 21, 22, the configuration of the first light reception unit 21 will be representatively described. In each of FIG. 7(a) to FIG. 9, the x-axis direction represents the vehicle front-rear direction, the y-axis direction represents the vehicle width direction, and the z-axis direction represents the vertical direction. As shown in FIGS. 7(a) and 7(b), as the angle of depression of the light from the light source 11 increases, the image location at which the light is concentrated by the lens 31 may possibly move off the light receiving surface of the PSD 32 in the vertical direction (z-axis direction) and the light from the light source 11 fail to be received by the light receiving surface of the PSD 32.

Figure 8A:
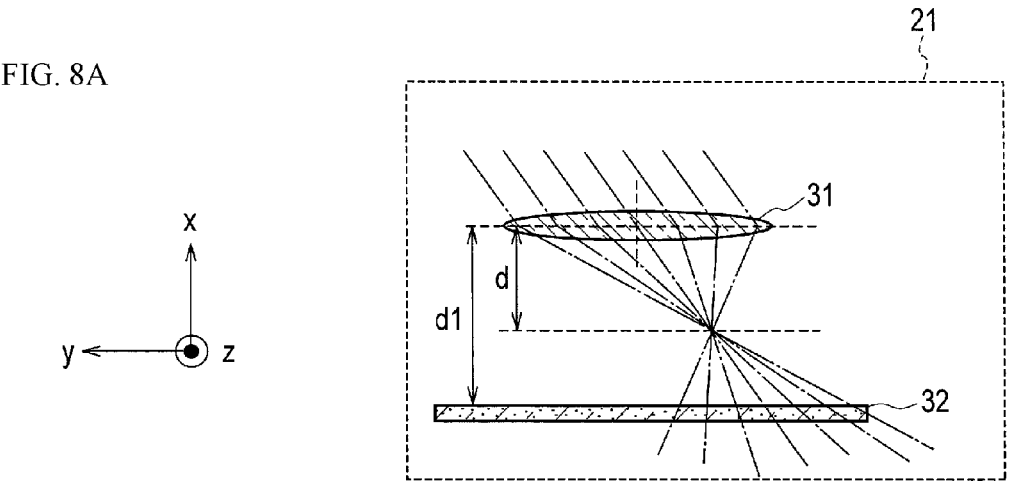
FIGS. 8(a) and 8(b) are schematic diagrams in an instance where the PSD of the light reception unit according to the second embodiment of the present invention is shifted to outside the focal length of the lens.
Figure 8B:
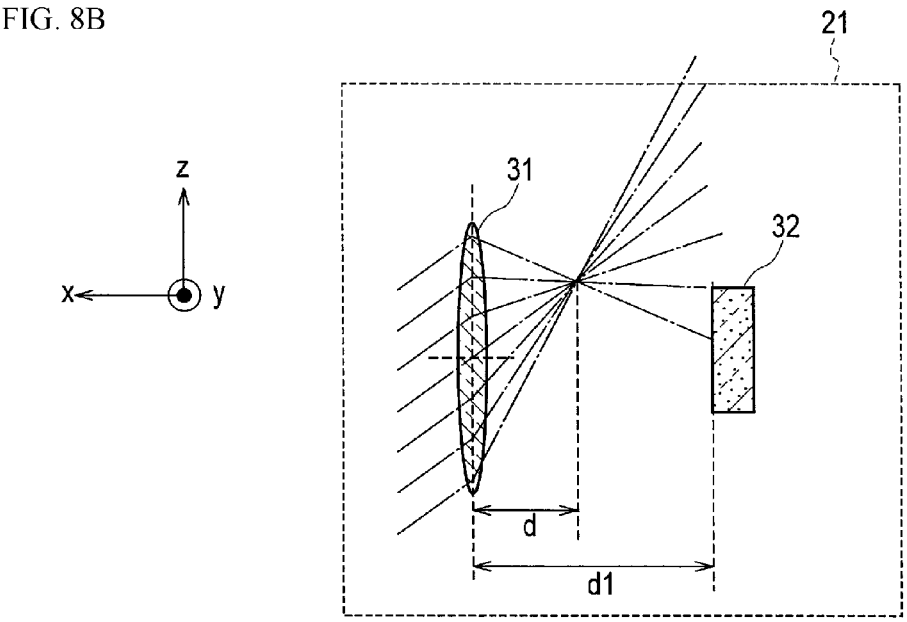

In view of this, in the second embodiment of the present invention, as shown in FIGS. 8(a) and 8(b), the light receiving surface of the PSD 32 of the first light reception unit 21 is disposed to be shifted to a position away from the lens 31 by a distance of d1 greater than the focal length d of the lens 31 in the vehicle front-rear direction (x-axis direction). With the PSD 32 disposed at the shifted position, the light from the light source 11 is not focused on the PSD 32, yet the light from the light source 11 can be received by the light receiving surface of the PSD 32. In this way, an incident position (position of center of gravity) P5 of the light can be calculated from the ratio of two output currents.

Figure 9:
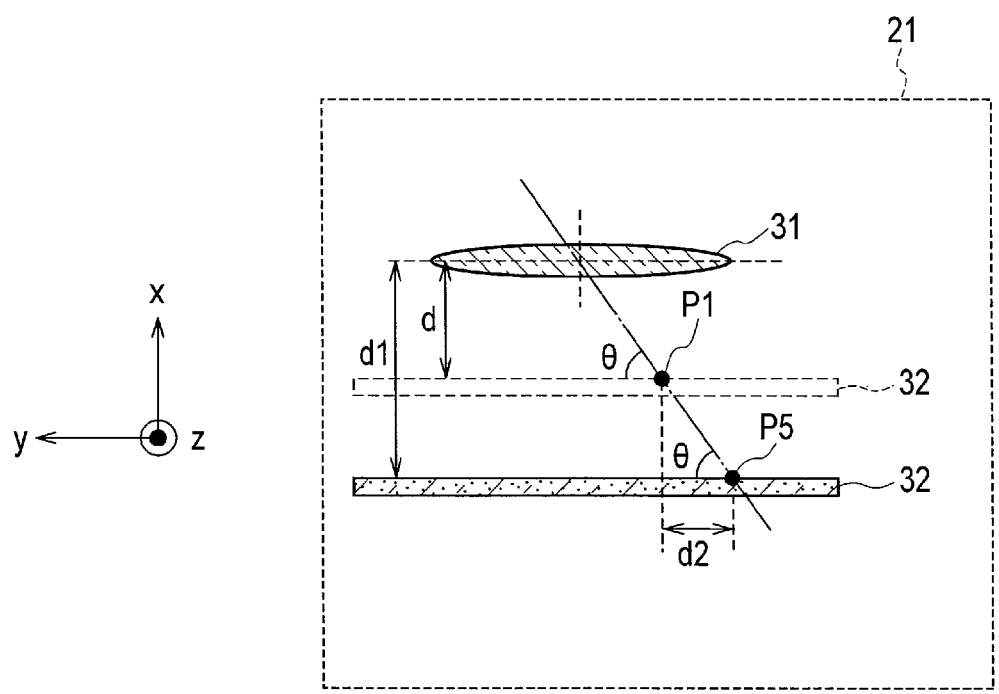
FIG. 9 is a schematic diagram for explaining a method of correcting the incident position of light according to the second embodiment of the present invention.

As shown in FIG. 9, the incident position P5 of the light on the PSD 32 disposed to be shifted to outside the focal length d of the lens 31 has a difference (error) d2 from the incident position P1 of the light on the PSD 32 disposed at the focal length d of the lens 31. By correcting this difference d2 through calculation, the incident position P1 of the light on the PSD 32 disposed at the focal length d of the lens 31 can be calculated. Similarly, for the second light reception unit 22, the PSD 34 is set at a position shifted to outside the focal length of the lens 33.

The other features of the configuration of the parking assistance system according to the second embodiment of the present invention are substantially similar to the configuration of the parking assistance system according to the first embodiment of the present invention, and overlapping description thereof will hence be omitted.

The parking assistance system according to the second embodiment of the present invention calculates the incident angles φ1, φ2 of light on the two PSDs 32, 34, respectively, and calculates the distance r between the vehicle 1 and the parking position and the orientation θ of the vehicle 1 based on these incident angles φ1, φ2 of the light. In this way, the position of the vehicle 1 can be accurately detected. Consequently, the vehicle 1 can be accurately parked at the target parking position, and power can be wirelessly supplied between the power reception coil 2 of the vehicle 1 during parking and the power transmission coil 3, which is provided at the parking position.

Further, unlike conventional systems utilizing reflection of transmitted waves, the parking assistance system according to the second embodiment of the present invention is free from situations where the area capable of receiving the reflected waves might change depending on the shape and orientation of the target object, and the transmitted waves might be reflected on an object other than the target object and cause false detection. Hence, the position of the vehicle 1 relative to the parking position can be stably detected.

Further, the light volume of the light source 11 is reduced as the vehicle 1 approaches the parking position. This can prevent saturation of light at the first and second light reception units 21, 22 when the vehicle 1 approaches the parking position. Hence, the position of the vehicle 1 relative to the parking position can be stably detected.

Further, the PSD 32, 34 of the first and second light reception units 21, 22 is disposed to be shifted to a position at a greater distance from the lens 31 than the focus position of the lens 31. In this way, the light receiving surface of the PSD 32, 34 can be virtually expanded. Hence, the position of the vehicle 1 relative to the parking position can be stably detected even when the vehicle 1 approaches the parking position and the angle of depression increases.

[Third Embodiment]

Figure 10:
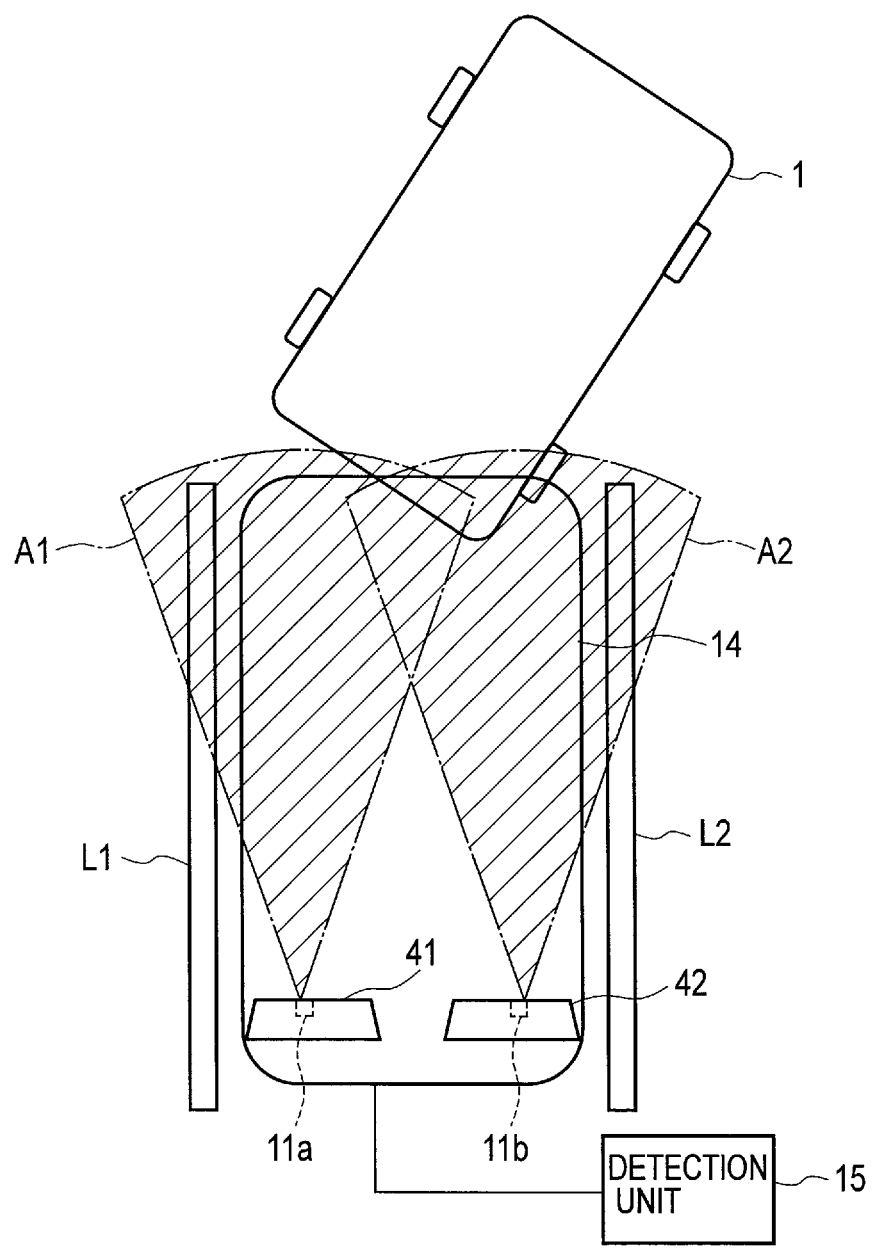
FIG. 10 is a schematic diagram showing one example of a parking assistance system according to a third embodiment of the present invention.

A parking assistance system according to a third embodiment of the present invention differs from the parking assistance system according to the first embodiment of the present invention in that it includes a plurality (two) of light sources 11a, 11b, as shown in FIG. 10.

Figure 11:
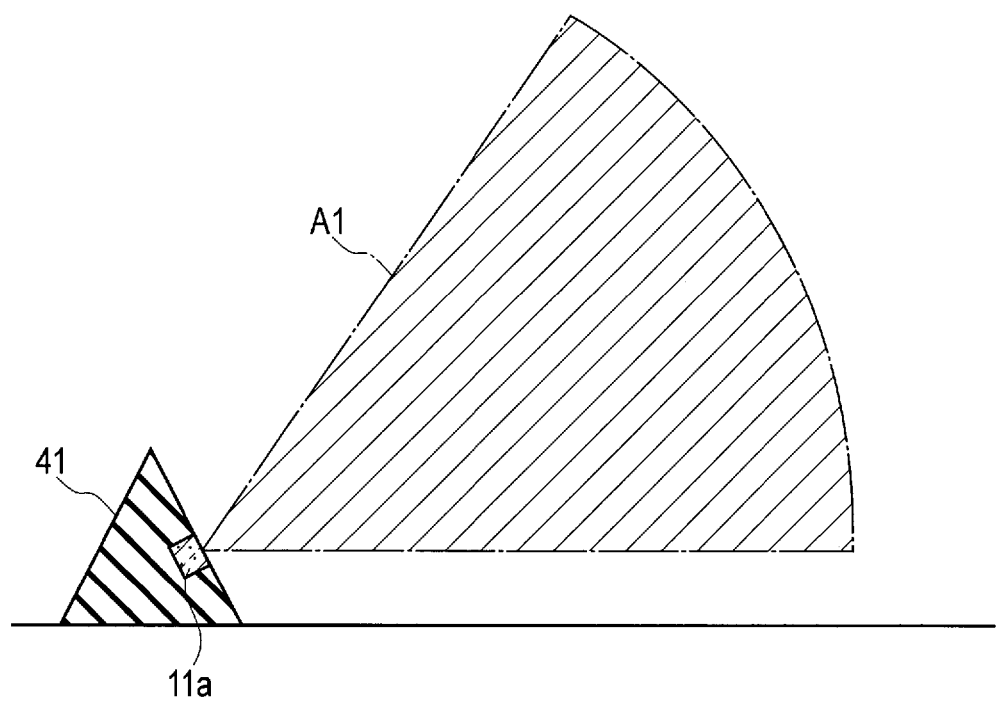
FIG. 11 is a schematic diagram showing one example of the arrangement of a light source according to a third embodiment of the present invention.

In FIG. 10, the target parking position is between white lines L1, L2. As shown in FIG. 10 and FIG. 11, the light sources 11a, 11b are buried in chocks 41, 42 at the parking position, respectively, for example. The positions where the light sources 11a, 11b are disposed are not particularly limited as long as they are near the parking position. The light-volume control unit 12 controls the light sources 11a, 11b such that one of them is selectively caused to light up. The light sources 11a, 11b may also light up alternately, for example, and the time for which each light source lights up can be set optionally. In FIG. 10 and FIG. 11, the shaded regions indicate light emission ranges A1, A2 from the light sources 11a, 11b, respectively.

In an example, the incident-angle calculation unit 23 and the distance calculation unit 24 acquire information on control of the plurality of light sources 11a, 11b from the light-volume control unit 12 through the wireless communication units 10, 20, and determine which one of the light sources 11a, 11b is lighting up. Then, based on which light source is lighting up, the incident-angle calculation unit 23 calculates the incident angles φ1, φ2 and the distance calculation unit 24 calculates the distance between the vehicle 1 and the parking position and the orientation of the vehicle 1.

The other configuration of the parking assistance system according to the third embodiment of the present invention are substantially similar to the configuration of the parking assistance system according to the first embodiment of the present invention, and overlapping description thereof will hence be omitted.

The parking assistance system according to the third embodiment of the present invention calculates the incident angles ϕ1, ϕ2 of light on the two PSDs 32, 34, respectively, and calculates the distance r between the vehicle 1 and the parking position and the orientation θ of the vehicle 1 based on these incident angles ϕ1, ϕ2 of the light. In this way, the position of the vehicle 1 can be accurately detected. Consequently, the vehicle 1 can be accurately parked at the target parking position, and power can be wirelessly supplied between the power reception coil 2 of the vehicle 1 during parking and the power transmission coil 3, which is provided at the parking position.

Further, unlike conventional systems utilizing reflection of transmitted waves, the parking assistance system according to the third embodiment of the present invention is free from situations where the area capable of receiving the reflected waves might change depending on the shape and orientation of the target object, and the transmitted waves might be reflected on an object other than the target object and cause false detection. Hence, the position of the vehicle 1 relative to the parking position can be stably detected.

Further, the light volume of each of the light sources 11*a*, 11*b* is reduced as the vehicle 1 approaches the parking position. This can prevent saturation of light at the first and second light reception units 21, 22 when the vehicle 1 approaches the parking position. Hence, the position of the vehicle 1 relative to the parking position can be stably detected.

Further, the plurality of light sources 11*a*, 11*b* is used such that one of them is selectively caused to light up. In this way, light can be emitted to the first and second light reception units 21, 22 from a plurality of positions. Hence, the rate and accuracy of detection of the position of the vehicle 1 can be improved.

In the third embodiment of the present invention, the instance has been described in which the two light sources 11*a*, 11*b* are included. Note, however, that three or more light sources may be included. In the case where three or more light sources are included, all the light sources may be caused to sequentially light up in a cycle, or a light source(s) may be selectively caused to light up in accordance with the position of the vehicle 1.

Although the content of the present invention has been described above through the first to third embodiments, it is obvious to those skilled in the art that the present invention is not limited to the description but various changes and modifications can be made.

REFERENCE SIGNS LIST

1 vehicle
2 power reception coil
3 power transmission coil
10, 20 wireless communication unit
11, 11*a*, 11*b* light source
12 light-volume control unit
13 approach detection device
14 buried coil
15 detection unit
21, 22 light reception unit
23 incident-angle calculation unit
24 distance calculation unit
25 vehicle control unit
31, 33 lens
32, 34 position sensitive detector (PSD)
41, 42 chock

The invention claimed is:

1. A parking assistance system comprising:
a light source provided at a parking position at which a power transmission coil is provided, and configured to emit light;
at least two light reception units mounted away from each other on a vehicle including a power reception coil, and each configured to receive the light emitted from the light source by using a position sensitive detector;
an incident-angle calculation unit configured to calculate an incident angle of the light on each of the at least two light reception units;
a distance calculation unit configured to calculate a distance between the parking position and the vehicle from the incident angles of the light on the at least two light reception units; and
a detection unit configured to detect that the vehicle has approached the parking position, wherein
a light volume of the light source is reduced when the detection unit detects that the vehicle has approached the parking position.

2. The parking assistance system according to claim 1, wherein
each of the at least two light reception units includes a lens configured to concentrate the light from the light source, and
a position of a light receiving surface of the position sensitive detector at each of the at least two light reception units is set to a position away from the lens by a distance greater than a focal length of the lens.

3. The parking assistance system according to claim 1, comprising
a plurality of the light sources, wherein
one of the plurality of light sources is selectively caused light up.

* * * * *